United States Patent
Ray et al.

(10) Patent No.: US 7,060,416 B2
(45) Date of Patent: Jun. 13, 2006

(54) POSITIVE-WORKING, THERMALLY SENSITIVE IMAGEABLE ELEMENT

(75) Inventors: Kevin B. Ray, Fort Collins, CO (US); Anthony Paul Kitson, Evans, CO (US); John Kalamen, Loveland, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/072,486

(22) Filed: Mar. 4, 2005

(65) Prior Publication Data

US 2005/0227163 A1 Oct. 13, 2005

Related U.S. Application Data

(63) Continuation-in-part of application No. 10/820,546, filed on Apr. 8, 2004, now abandoned.

(51) Int. Cl.
- G03F 7/38 (2006.01)
- G03F 7/40 (2006.01)
- G03F 7/11 (2006.01)
- G03F 7/075 (2006.01)
- G03F 7/039 (2006.01)
- B41N 1/14 (2006.01)

(52) U.S. Cl. .............. 430/285.1; 430/270.1; 430/271.1; 430/302; 430/944; 101/456; 101/463.1; 101/467; 525/103; 526/243; 526/245; 526/248; 526/262

(58) Field of Classification Search .............. None
See application file for complete search history.

(56) References Cited

U.S. PATENT DOCUMENTS

| | | | |
|---|---|---|---|
| 4,491,628 A | 1/1985 | Ito et al. | |
| 4,883,740 A | 11/1989 | Schwalm et al. | |
| 5,066,566 A | 11/1991 | Novembre | |
| 5,073,474 A | 12/1991 | Schwalm et al. | |
| 5,075,199 A | 12/1991 | Schwalm et al. | |
| 5,102,771 A | 4/1992 | Vogel et al. | |
| 5,350,660 A | 9/1994 | Urano et al. | |
| 5,759,750 A | 6/1998 | Binder et al. | |
| 5,827,634 A | 10/1998 | Thakeray et al. | |
| 5,882,835 A | 3/1999 | Park et al. | |
| 5,994,023 A | 11/1999 | Van Damme et al. | |
| 6,033,827 A | 3/2000 | Itani | |
| 6,060,217 A | 5/2000 | Nguyen et al. | |
| 6,143,464 A | 11/2000 | Kawauchi | |
| 6,294,311 B1 | 9/2001 | Shimazu et al. | |
| 6,352,811 B1 | 3/2002 | Patel et al. | |
| 6,352,812 B1 | 3/2002 | Shimazu et al. | |
| 6,358,669 B1 | 3/2002 | Savariar-Hauck et al. | |
| 6,475,698 B1 | 11/2002 | Monk et al. | |
| 6,528,228 B1 | 3/2003 | Savariar-Hauck et al. | |
| 6,534,238 B1 | 3/2003 | Savariar-Hauck et al. | |
| 6,593,055 B1 | 7/2003 | Shimazu et al. | |
| 6,645,689 B1 | 11/2003 | Jarek | |
| 6,673,514 B1 | 1/2004 | Kitson et al. | |

FOREIGN PATENT DOCUMENTS

| | | |
|---|---|---|
| EP | 0 737 896 | 10/1996 |
| EP | 1 522 417 | 4/2005 |
| JP | H10-055067 | 2/1998 |
| JP | H11-119419 | 4/1999 |
| JP | 2000-330265 | 11/2000 |
| WO | 01/45958 | 6/2001 |
| WO | WO-03/023515 A1 * | 3/2003 |

OTHER PUBLICATIONS

M.J. O'Brien, et al., *Advances in Resist Technology and Processing V*, SPIE vol. 920, 42-50 (1998).
D.R. McKean, et al., *Advances in Resist Technology and Processing V*, SPIE vol. 920, 60-63 (1988).
A. Reiser, *Photoreactive Polymers: The Science and Technology of Resists*, pp. 278-284, Wiley, New York, 1989.

* cited by examiner

Primary Examiner—Cynthia Hamilton

(57) ABSTRACT

Alkali soluble copolymers, imageable elements useful as lithographic printing plate precursors that contain the alkali soluble copolymers, and methods for forming images using the imageable elements are disclosed. The alkali soluble copolymers comprise, in polymerized form: (a) N-phenylmaleimide, N-cyclohexylmaleimide, N-benzylmaleimide, or a mixture thereof; (b) acrylamide, methacrylamide, or a mixture thereof; (c) acrylonitrile, methacrylonitrile, or a mixture thereof; and (d) one or more monomers selected from the group consisting of monomers of the structure: $CH_2=C(R)$-Z-X—NHC(O)NH—Y—R', in which: X is —[C(CH$_3$)$_2$]— or —[(CH$_2$)$_n$]—, in which n is 0 to 12; Y is o-, m-, or p- —[C$_6$H$_4$]—; Z is —[C(O)O]—, —[C(O)NH]—, or o-, m-, or p- [—C$_6$H$_4$]—; R is hydrogen or $C_1$ to $C_4$ alkyl; R' is —OC(O)—OR", —OC(O)—Ar, or —OSO$_2$—Ar; R" is $C_1$ to $C_{12}$ alkyl, $C_1$ to $C_{12}$ arylalkyl, $C_1$ to $C_{12}$ aryl, $C_1$ to $C_{12}$ alkenyl, or trimethylsilyl; Ar is $C_6H_{5-n'}T_{n'}$, in which Ar has a total of six to ten carbon atoms; each T is independently selected from the group consisting of $C_1$ to $C_4$ alkyl, fluoro, chloro, bromo, iodo, trifluoromethyl, methoxy, and cyano; and n' is an integer from 0 to 5; and in which the copolymer is soluble in alkaline solutions having a pH greater than at least about 11.

47 Claims, No Drawings

POSITIVE-WORKING, THERMALLY SENSITIVE IMAGEABLE ELEMENT

CROSS-REFERENCE TO RELATED APPLICATIONS

This application is a continuation-in-part of U.S. patent application Ser. No. 10/820,546, filed Apr. 8, 2004 now abandoned, the disclosure of which is incorporated herein by reference.

FIELD OF THE INVENTION

This invention relates to lithographic printing. In particular, this invention relates to imageable elements useful as lithographic printing plate precursors that contain alkali soluble copolymers.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive-working. Conversely, if the unimaged regions are removed, the precursor is negative-working. In each instance, the regions of the imageable layer (i.e., the image areas) that remain are ink-receptive, and the regions of the hydrophilic surface revealed by the developing process accept water and aqueous solutions, typically a fountain solution, and repel ink.

Direct digital imaging, which obviates the need for imaging through a mask, is becoming increasingly important in the printing industry. There is a desire for positive working, thermally imageable elements that can be developed in conventional high pH developers and that are both bakable and resistant to press chemistries, such as inks, fountain solution, and the solvents used in washes, such as UV washes. Bakability is highly desirable because baking increases the press runlength. Thus, a need exists for thermally imageable elements that can be developed in high pH developers, resist chemicals typically encountered in a press room environment, and can be baked in order to increase runlength.

SUMMARY OF THE INVENTION

In one aspect, the invention is an alkali soluble copolymer. The copolymer comprises, in polymerized form:

(a) 1 wt % to 30 wt % of N-phenylmaleimide, N-cyclohexylmaleimide, N-benzylmaleimide, or a mixture thereof;

(b) about 1 wt % to about 30 wt % of acrylamide, methacrylamide, or a mixture thereof;

(c) about 20 wt % to about 75 wt % of acrylonitrile, methacrylonitrile, or a mixture thereof; and (d) a total of about 20 wt % to about 75 wt % of one or more monomers selected from the group consisting of monomers of the structure:

$CH_2=C(R)-Z-X-NHC(O)NH-Y-R'$ in which:

X is $-[C(CH_3)_2]-$ or $-[(CH_2)_n]-$, in which n is 0 to 12;

Y is o-, m-, or p- $-[C_6H_4]-$;

Z is $-[C(O)O]-$, $-[C(O)NH]-$, or o-, m-, or p- $-[C_6H_4]-$;

R is hydrogen or $C_1$ to $C_4$ alkyl;

R' is $-OC(O)-OR''$, $-OC(O)-Ar$, or $-OSO_2-Ar$;

R" is $C_1$ to $C_{12}$ alkyl, $C_1$ to $C_{12}$ arylalkyl, $C_1$ to $C_{12}$ aryl, $C_1$ to $C_{12}$ alkenyl, trimethylsilyl;

Ar is $C_6H_{5-n'}T_{n'}$, in which Ar has a total of six to ten carbon atoms;

each T is independently selected from the group consisting of $C_1$ to $C_4$ alkyl, fluoro, chloro, bromo, iodo, trifluoromethyl, methoxy, and cyano; and n' is an integer from 0 to 5; and in which the copolymer is soluble in alkaline solutions having a pH greater than at least about 11.

In another aspect, the invention is an imageable element comprising the alkali soluble copolymer. The imageable element, which is useful as a lithographic printing plate precursor, may be a single layer imageable element or a multi-layer imageable element. In yet another aspect, the invention is a method for forming an image by imaging and developing the imageable element.

DETAILED DESCRIPTION OF THE INVENTION

Unless the context indicates otherwise, in the specification and claims, the terms first binder, second binder, resole resin, surfactant, novolac resin, photothermal conversion material, dissolution inhibitor, alkaline soluble copolymer, coating solvent, and similar terms also include mixtures of such materials. Unless otherwise specified, all percentages are percentages by weight. Thermal imaging refers to imaging with a hot body, such as a thermal head, or with infrared radiation.

Alkali Soluble Copolymers

Although the copolymers have been defined in terms of the monomers that conceptually can be used to form the copolymers, this does not limit the copolymers to those formed by polymerization of the indicated monomers. The copolymers may be formed by other routes, such as by modification of precursor polymers. For example, the copolymer may be formed by addition of various side chain structural units, such as a carbonate ($-OC(O)-OR''$) group, an ester ($-OC(O)-Ar$) group, and/or a sulfonate ester ($-O_3SAr$) group, to a precursor polymer. The alkali soluble copolymers are soluble in alkaline solutions having a pH greater than at least about 11, typically soluble in alkaline solutions having a pH greater than at least about 12, more typically soluble in alkaline solutions having a pH of about 12 to about 14.

The alkali soluble copolymers comprise, in polymerized form, about 1 wt % to about 30 wt %, preferably about 3 wt % to about 20 wt %, of N-phenylmaleimide, N-cyclohexylmaleimide, N-benzylmaleimide, or a mixture thereof. N-Phenylmaleimide is preferred.

The alkali soluble copolymers comprise, in polymerized form, about 1 wt % to about 30 wt %, preferably about 5 wt % to about 20 wt %, of acrylamide, methacrylamide, or a mixture thereof. Methacrylamide is preferred.

The alkali soluble copolymers comprise, in polymerized form, about 20 wt % to about 75 wt %, preferably about 35 wt % to about 60 wt %, of acrylonitrile, methacrylonitrile, or a mixture thereof. Acrylonitrile is preferred.

The alkali soluble copolymers comprise, in polymerized form a total of about 20 wt % to about 75 wt %, preferably about 30 wt % to about 60 wt %, of one or more monomers selected from the group consisting of monomers of the structure:

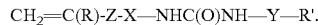

$CH_2$=C(R)-Z-X—NHC(O)NH—Y—R'.

X is —[C($CH_3$)$_2$]— or —[($CH_2$)$_n$]—, in which n is 0 to 12. When X is —[($CH_2$)$_n$]— and n is 0, the Z group is bonded directly to the —NHC(O)NH—Y—R' group. Preferred groups for X include —[C($CH_3$)$_2$]— and —[($CH_2$)$_2$]—.

Y is phenylene (—[$C_6H_4$]—). The phenylene may be ortho-, meta-, or para-substituted. Preferred groups for Y include para-substituted phenylene (p-[$C_6H_4$]—).

Z is —[C(O)O]—, —[C(O)NH]—, or phenylene (—[$C_6H_4$]—), which may be ortho-, meta-, or para-substituted. Preferred groups for Z include —[C(O)O]— and meta-substituted phenylene (m-[$C_6H_4$]—).

R is hydrogen or $C_1$ to $C_4$ alkyl. Typical $C_1$ to $C_4$ alkyl groups are, for example, methyl, ethyl, n-propyl, i-propyl, n-butyl, i-butyl, sec-butyl, and t-butyl. Preferred groups for R include hydrogen and methyl. Methyl is more preferred.

R' is —OC(O)—OR", —OC(O)—Ar, or —$OSO_2$—Ar.

R" is $C_1$ to $C_{12}$ alkyl, $C_1$ to $C_{12}$ aryl or substituted aryl, $C_1$ to $C_{12}$ arylalkyl, $C_1$ to $C_{12}$ aryl, $C_1$ to $C_{12}$ alkenyl, or trimethylsilyl. Typical $C_1$ to $C_{12}$ alkyl groups include, for example, methyl; ethyl; n-propyl; i-propyl; n-butyl; i-butyl; sec-butyl; t-butyl; n-pentyl; i-pentyl; sec-pentyl; 1,1-dimethylpropyl; 2,2-dimethylpropyl; n-hexyl; 1,1-dimethylbutyl; n-heptyl; 1,1-dimethylpentyl; 2-ethylpentyl; 5-methylhexyl; n-octyl; 1,1-dimethylhexyl; 2,2,4-trimethylpentyl; 1,1,3,3-tetramethylbutyl; 2-ethylhexyl; n-nonyl; 1,1-dimethylheptyl; n-decyl; 1,1-dimethyloctyl; n-undecyl; 1,1-dimethylnonyl; n-dodecyl; and 1,1-dimethyldecyl. Typical $C_1$ to $C_{12}$ aryl and substituted aryl groups include phenyl, 1-naphthyl, 2-naphthyl, p-methylphenyl, m-methylphenyl, o-methylphenyl, p-methoxyphenyl, m-methoxyphenyl, o-methoxyphenyl, p-ethoxyphenyl, p-ethylphenyl, p-i-propylphenyl, p-t-butylphenyl, p-chlorophenyl, p-bromophenyl, p-cyanophenyl, m-cyanophenyl, p-fluorophenyl, pentafluorophenyl, pentachlorophenyl, p-trifluoromethylphenyl, 3,5-dichlorophenyl, 3,5-diethylphenyl, and 2,4,6-trimethylphenyl. Typical $C_1$ to $C_{12}$ aralkyl groups include, for example, benzyl; 1-phenylethyl; 2-phenylethyl; 2-phenylpropyl; 1-phenyl-1-methylethyl; 1-phenyl-1-methylethyl; 3-phenylpropyl; 4-phenylbutyl; 2-phenyl-1,1-dimethylethyl; 1-phenyl-1-methylpropyl; 6-phenylhexyl; and 4-phenyl-1,1-dimethylbutyl. Typical $C_1$ to $C_{12}$ alkenyl groups include, for example, allyl (2-propenyl) ($CH_2$=CH—$CH_2$—); 1-methylallyl ($CH_2$=CH—C($CH_3$)H—); 1,1-dimethylallyl ($CH_2$=CH—C($CH_3$)$_2$—); 1-methyl-3-butenyl ($CH_2$=CH—$CH_2$—C($CH_3$)H—); 1-methyl-2-butenyl ($CH_3$CH=CH—C($CH_3$)H—); 1,1-dimethyl-3-butenyl ($CH_2$=CH—$CH_2$—C($CH_3$)$_2$—); and 1,1-dimethyl-9-decenyl ($CH_2$=CH—($CH_2$)$_7$—C($CH_3$)$_2$—). Preferred groups for R" include t-butyl; phenyl, 1-phenylethyl ($CH_3$—CH($C_6H_5$)—), benzyl, 1-methylallyl, and trimethylsilyl. The t-butyl carbonate (t-BOC) group, in which R" is t-butyl, is a more preferred carbonate group.

Ar is $C_6H_{5-n'}T_{n'}$, in which Ar has a total of six to ten carbon atoms. The total of six to ten carbon atoms includes both the carbon atoms in the six-membered aromatic system and the carbon atoms in substituents that may be present on the aromatic system, for example, the carbon atoms in methyl, ethyl, propyl, butyl, trifluoromethyl, cyano, and methoxy groups. The 4-methylphenyl (p-methylphenyl or tosyl) group, for example, has seven carbon atoms. Each T independently is selected from the group consisting of $C_1$ to $C_4$ alkyl, fluoro, chloro, bromo, iodo, trifluoromethyl, methoxy, and cyano. $C_1$ to $C_4$ alkyl groups include, for example, methyl; ethyl, n-propyl; i-propyl; n-butyl; i-butyl; sec-butyl; and t-butyl. n' is an integer from 0 to 5. When n' is 0, for example, Ar is phenyl. When n' is one and T is methyl, Ar is either p-methylphenyl (tosyl), m-methylphenyl, or o-methylphenyl. When n' is 5 and each T is fluoro, Ar is pentafluorophenyl. Typical Ar groups include, for example, phenyl, p-methylphenyl (tosyl), m-methylphenyl, o-methylphenyl, p-methoxyphenyl, m-methoxyphenyl, o-methoxyphenyl, p-ethoxyphenyl, p-ethylphenyl, p-i-propylphenyl, p-t-butylphenyl, p-chlorophenyl, p-bromophenyl (brosyl), p-cyanophenyl, m-cyanophenyl, p-fluorophenyl, pentachlorophenyl, p-trifluoromethylphenyl, 3,5-dichlorophenyl, 3,5-dimethylphenyl, 3,5-diethylphenyl, 3,5-bis(trifluoromethyl) phenyl, and 2,4,6-trimethylphenyl. Because each T is independently selected, more than one type of substituent may be present on the aromatic system. Ar may be, for example, 4-fluoro-2,6-dichlorophenyl, 4-methyl-3,5-dichlorophenyl, 4-bromo-2,6-dimethylphenyl, or 4-methyl-3-cyanophenyl. Preferred Ar groups are phenyl and 4-methylphenyl (tosyl).

The alkali soluble copolymers may comprise, in polymerized form, one or more additional monomers. Monomers that contain ionizable groups may be present to enhance or control the solubility characteristics of the copolymer in aqueous base. For example, the copolymer may comprise, in polymerized form, about 5 wt % to about 30 wt %, preferably about 10 wt % to about 30 wt %, of acrylic acid, methacrylic acid, or a mixture thereof. Other additional monomers include, for example, the acryl amide or methacryl amide of an amino benzoic acid, such as the acryl amide or methacryl amide of p-amino benzoic acid ($CH_2$=C(R)—CONH-p-$C_6H_4$—$CO_2$H), and the half esters formed from the reaction of a cyclic anhydride, such as succinic anhydride or phthalic anhydride, with an acrylate or methacrylate that contains a hydroxyl group, such as 2-hydroxyethyl methacrylate or 2-hydroxyethyl acrylate ($CH_2$=C(R)—$CO_2$—$CH_2CH_2$—$O_2$C—W—$CO_2$H, in which W is —[($CH_2$)$_2$]— or -[o-$C_6H_4$]—.

The alkali soluble copolymers may be prepared by various routes. The following lists some of the procedures by which they may be prepared. Other procedures may be apparent to those skilled in the art.

The copolymers may be prepared by, for example, free radical polymerization. Free radical polymerization is well known to those skilled in the art and is described, for example, in Chapters 20 and 21, of *Macromolecules*, Vol. 2, 2nd Ed., H. G. Elias, Plenum, New York, 1984. Useful free radical initiators are peroxides such as benzoyl peroxide, hydroperoxides such as cumyl hydroperoxide and azo compounds such as 2,2'-azobis(isobutyronitrile) (AIBN). Chain transfer agents, such as dodecyl mercaptan, may be used to control the molecular weight of the copolymer. Suitable solvents for free radical polymerization include liquids that are inert to the reactants and which will not otherwise adversely affect the reaction, for example, esters such as ethyl acetate and butyl acetate; ketones such as methyl ethyl ketone, methyl isobutyl ketone, methyl propyl ketone, and acetone; alcohols such as methanol, ethanol, isopropyl alcohol, and butanol; ethers such as dioxane and tetrahydrofuran, and mixtures thereof.

Monomers may be polymerized in the desired amounts to produce the desired alkali soluble copolymer. For example, isocyanate containing monomers, such as isocyanatoalkyl acrylate or methacrylate, for example, isocyanatoethyl methacrylate, or an isocyanate containing alkyl substituted styrene such as, for example, 1-(1-isocyanato-1-methyl)-ethyl 3-(1-methyl)-ethenyl benzene ($CH_2=C(CH_3)$-m-$C_6H_4$—$C(CH_3)_2$—NCO), may be reacted with the appropriate aromatic amine to form a urea. The carbonate group may be added to the amine either before or after urea formation. Formation of carbonate containing free radical polymerizable monomers and conversion of these monomers to polymers containing the carbonate group is disclosed, for example, in Ito, U.S. Pat. No. 4,491,628.

Alternatively, the alkali soluble copolymers may be formed by modification of a precursor polymer. For example, isocyanate containing monomers, such as those listed above, may be copolymerized to produce a precursor polymer that contains isocyanate functionality. Polymerization of an isocyanate containing monomer and reaction of the isocyanato groups to introduce functionality into the resulting polymer is disclosed, for example, in Dueber, U.S. Pat. No. 4,565,759, column 8, line 61, to column 10, line 52. The precursor polymer can then be reacted with the appropriate carbonate containing, ester containing, and/or sulfonate ester containing aromatic amine or amines to produce the desired polymer. Alternatively, the urea functionality and the carbonate, ester or sulfate ester functionality can be introduced in separate steps. For example, an isocyanate containing precursor polymer can be reacted with an aromatic amine such as p-aminophenol, to produce a second precursor polymer, which contains phenolic hydroxyl groups. The phenolic hydroxyl groups can be converted to carbonate, ester, and/or sulfonate ester groups.

Alternatively, the precursor polymer can be prepared from a phenolic hydroxyl containing monomer. Useful phenolic hydroxyl containing monomers include, for example:

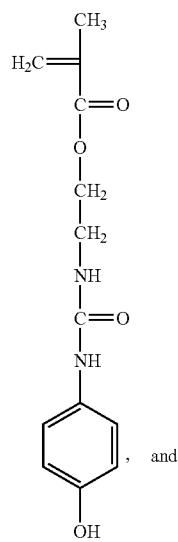
, and

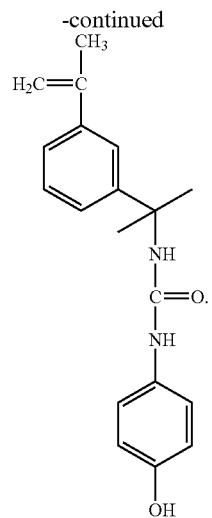

The phenolic hydroxyl containing monomer or monomers are copolymerized with the other desired monomers to produce a precursor polymer that contains phenolic hydroxyl groups. This sequence is illustrated in, for example, Patel, U.S. Pat. No. 6,352,811, Synthesis Examples 2, 4, and 5, the disclosure of which is incorporated herein by reference. The phenolic hydroxyl groups are then converted to carbonate groups, ester groups, and/or sulfonate ester groups. Phenolic hydroxyl groups may be converted to carbonate groups using procedures well known to those skilled in the art. The t-butyl carbonate (t-BOC) group, for example may be introduced by reaction of a copolymer containing phenolic hydroxyl groups with di-t-butyldicarbonate in the presence of potassium carbonate and 18-crown-6. Phenolic hydroxyl groups may be converted to ester (—OC(O)—Ar) groups and/or sulfonate ester (—$O_3$SAr) groups by for example, reaction with an acid halide, such as an acid chloride or mixture of acid chlorides, to form an ester group or mixture of ester groups and/or reaction with a sulfonyl halide, such as a sulfonyl chloride or mixture of sulfonyl chlorides, to form a sulfonate ester group or mixture of sulfonate ester groups. Typical acid halides are, for example, benzoyl chloride, o-anisoyl chloride, m-anisoyl chloride, p-anisoyl chloride, otoluoyl chloride, m-toluoyl chloride, p-toluoyl chloride, 2-bromobenzoyl chloride, 3-bromobenzoyl chloride, 4-bromobenzoyl chloride, 2-chlorobenzoyl chloride, 3-chlorobenzoyl chloride, 4-chlorobenzoyl chloride, p-isopropylbenzoyl chloride, 3,5-bis(trifluoromethyl)benzoyl chloride, and p-(trifluoromethyl)benzoyl chloride. Preferred acid chlorides are benzoyl chloride and p-toluoyl chloride. Typical sulfonyl halides are, for example, benzenesulfonyl chloride, p-toluene sulfonyl chloride, 4-chlorophenylsulfonyl chloride, 4-bromophenylsulfonyl chloride, 4-fluorobenzenesulfonyl chloride, and 4-methoxybenzenesulfonyl chloride. Preferred sulfonyl chlorides are benzenesulfonyl chloride and p-toluenesulfonyl chloride.

Imageable Elements

The alkali soluble copolymers may be used in positive working imageable elements. The imageable element comprises an imageable layer or top layer, which comprises an imageable composition, over the surface of a substrate. Other layers that are conventional components of imageable elements may also be present. For example, the imageable layer may be on the substrate, or other layers, such as an underlayer, may be present between the imageable layer and the substrate. The imageable element also comprises a photothermal conversion material, which may be present in the imageable layer, in an underlayer, or in a separate absorber layer between the imageable layer and the underlayer if the underlayer is present, or between the imageable layer and the substrate if the underlayer is not present. However, the imageable element typically does not comprise a thermally activated acid generator.

Substrate

The substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a cylinder in a printing press, typically about 100 μm to about 600 μm. Typically, the substrate comprises an interlayer between the aluminum support and the overlying layer or layers. The interlayer may be formed by treatment of the aluminum support with, for example, silicate, dextrine, hexafluorosilicic acid, phosphate/fluoride, polyvinyl phosphonic acid (PVPA), vinyl phosphonic acid copolymers, or a water-soluble diazo resin.

The back side of the support (i.e., the side opposite the underlayer and imageable layer) may be coated with an antistatic agent and/or a slipping layer or matte layer to improve handling and "feel" of the imageable element.

Photothermal Conversion Material

Imageable elements that are to be imaged with infrared radiation typically comprise an infrared absorber, known as a photothermal conversion material. Photothermal conversion materials absorb radiation and convert it to heat. Although a photothermal conversion material is not necessary for imaging with a hot body, imageable elements that contain a photothermal conversion material may also be imaged with a hot body, such as a thermal head or an array of thermal heads.

The photothermal conversion material may be any material that can absorb radiation and convert it to heat. Suitable materials include dyes and pigments. Suitable pigments include, for example, carbon black, Heliogen Green, Nigrosine Base, iron (III) oxide, manganese oxide, Prussian Blue, and Paris Blue. Because of its low cost and wide absorption bands that allow it to be used with imaging devices having a wide range of peak emission wavelengths, one particularly useful pigment is carbon black. The size of the pigment particles should not be more than the thickness of the layer that contains the pigment. Preferably, the size of the particles will be half the thickness of the layer or less.

To prevent sludging of the developer by insoluble material, photothermal conversion materials that are soluble in the developer are preferred. The photothermal conversion material may be a dye with the appropriate absorption spectrum and solubility. Dyes, especially dyes with a high extinction coefficient in the range of 750 nm to 1200 nm, are preferred. Examples of suitable dyes include dyes of the following classes: methine, polymethine, arylmethine, cyanine, hemicyanine, streptocyanine, squarylium, pyrylium, oxonol, naphthoquinone, anthraquinone, porphyrin, azo, croconium, triarylamine, thiazolium, indolium, oxazolium, indocyanine, indotricarbocyanine, oxatricarbocyanine, phthalocyanine, thiocyanine, thiatricarbocyanine, merocyanine, cryptocyanine, naphthalocyanine, polyaniline, polypyrrole, polythiophene, chalcogenopyryloarylidene and bis(chalcogenopyrylo)polymethine, oxyindolizine, pyrazoline azo, and oxazine classes. Absorbing dyes are disclosed in numerous publications, for example, Nagasaka, EP 0,823, 327; DeBoer, U.S. Pat. No. 4,973,572; Jandrue, U.S. Pat. No. 5,244,771; Patel, U.S. Pat. No. 5,208,135; and Chapman, U.S. Pat. No. 5,401,618. Other examples of useful absorbing dyes include: ADS-830A and ADS-1064 (American Dye Source, Montreal, Canada), EC2117 (FEW, Wolfen, Germany), Cyasorb IR 99 and Cyasorb IR 165 (Glendale Protective Technology), Epolite IV-62B and Epolite III-178 (Epoline), SpectralR 830A and SpectralR 840A (Spectra Colors), as well as IR Dye A, and IR Dye B, whose structures are shown below.

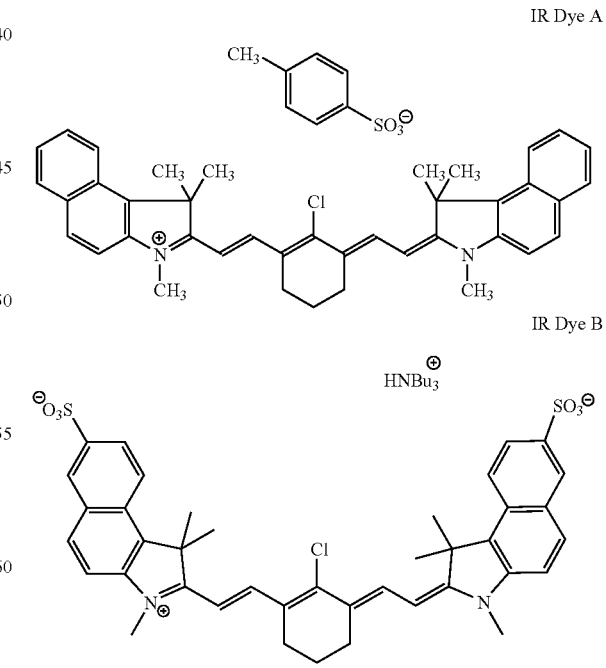

The amount of photothermal conversion material present in the element is generally sufficient to provide an optical density of at least 0.05, and preferably, an optical density of from about 0.5 to at least about 2 to 3 at the imaging wavelength. As is well known to those skilled in the art, the amount of compound required to produce a particular optical density at a particular wavelength can be determined using Beer's law.

To prevent ablation during imaging with infrared radiation, when the element is a multi-layer imageable element, the imageable layer is preferably substantially free of photothermal conversion material. That is, the photothermal conversion material in the imageable layer, if any, absorbs less than about 10% of the imaging radiation, preferably less than about 3% of the imaging radiation, and the amount of imaging radiation absorbed by the imageable layer, if any, is not enough to cause ablation of the imageable layer.

Thermally Activated Acid Generators

The imageable elements of the invention, especially the imageable elements that comprise the carbonate containing alkali soluble co-polymers, do not require a thermally activated acid generator. Imageable compositions and layers that comprise carbonate containing polymers and thermally activated acid generators are described, for example, in *Photoreactive Polymers: The Science and Technology of Resists*, A. Reiser, Wiley, New York, 1989, pp. 279–283. In these systems, on imaging, the acid generator generates acid, which catalyzes removal of the carbonate functionality from the polymer, changing its rate of dissolution of the imageable layer in an alkaline developer.

Thermally activated acid generators are compounds that form a Brönsted acid by thermally initiated decomposition. Non-ionic acid generators include, for example, haloalkyl-substituted s-triazines, which are described, for example, in Smith, U.S. Pat. No. 3,779,778. Haloalkyl-substituted s-triazines are s-triazines substituted with one to three $CX_3$ groups in which X is bromo or, preferably, chloro. Examples include 2-phenyl-4,6-bis(trichloromethyl)-s-triazine, 2,4,6-tris(trichloromethyl)-s-triazine, 2-methyl-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, and 2-[4-(2-ethoxyethyl)-naphtho-1-yl]-4,6-bis-trichloromethyl-s-triazine. Ionic acid generators include, for example, onium salts in which the onium cation is iodonium, sulphonium, phosphonium, oxysulphoxonium, oxysulphonium, sulphoxonium, ammonium, or diazonium, and the anion is a chloride, bromide, or a non-nucleophilic anion such as tetra-fluoroborate, hexafluorophosphate, hexafluoroarsenate, hexafluoroantimonate, triflate, tetrakis(pentafluoro-phenyl)borate, pentafluoroethyl sulfonate, p-methyl-benzyl sulfonate, ethyl sulfonate, trifluoromethyl acetate, and pentafluoroethyl acetate. Typical onium salts include, for example, diphenyl iodonium chloride, diphenyl iodonium hexafluorophosphate, diphenyl iodonium hexafluoroantimonate, 4,4'-dicumyl iodonium chloride, 4,4'-dicumyl iodonium hexafluorophosphate, N-methoxy-alpha-picolinium-ptoluene sulfonate, 4-methoxybenzene-diazonium tetrafluoroborate, 4,4'-bis-dodecylphenyl iodonium-hexafluorophosphate, 2-cyanoethyl-triphenylphosphonium chloride, bis-[4-diphenylsulfoniophenyl]sulfide-bis-hexafluorophosphate, bis-4-dodecylphenyliodonium hexafluoroantimonate, triphenyl sulfonium hexafluoroantimonate, triphenyl sulfonium tetrafluoroborate, 2-methoxy-4-aminophenyl diazonium hexafluorophosphate, phenoxyphenyl diazonium hexafluoroantimonate, and anilinophenyl diazonium hexafluoroantimonate.

However, in imageable elements of the invention, especially the imageable elements that comprise the carbonate containing alkali soluble co-polymers, imaging does not require a thermally activated acid generator. Consequently, the imageable elements of the invention, especially the imageable elements that comprise the carbonate containing alkali soluble co-polymers, do not comprise a thermally activated acid generator, such as is described above.

Single Layer Elements

Single layer elements comprise a layer of an imageable composition, known as the top layer or imageable layer, over the substrate. The imageable layer becomes soluble or dispersible in the developer following thermal exposure. Thermally imageable, single layer elements are disclosed, for example, in West, U.S. Pat. No. 6,090,532; Parsons, U.S. Pat. No. 6,280,899; McCullough, U.S. Pat. Pub. No. 2002/0136961; and WO99/21715. The imageable composition comprises an ink-receptive polymeric material, known as a binder, a dissolution inhibitor, a photothermal conversion material, and an alkali soluble copolymer described above or a mixture of the alkali soluble copolymers described above. Alternatively, or additionally, the polymeric material may comprise polar groups and acts as both the binder and dissolution inhibitor. Other materials that are conventional components of the imageable layer of single layer imageable elements may also be present.

The binder in an imageable layer will be referred to as the first binder. Preferably, the binder in the single layer imageable element is a light-stable, water-insoluble, developer-soluble, film-forming phenolic resin. Phenolic resins have a multiplicity of phenolic hydroxyl groups, either on the polymer backbone or on pendent groups. Useful phenolic resins include polyvinyl compounds having phenolic hydroxyl groups, such as, polyhydroxystyrenes and copolymers containing recurring units of a hydroxystyrene, and polymers and copolymers containing recurring units of substituted hydroxystyrenes. Novolac resins, resol resins, and polyhydroxystyrenes are preferred phenolic resins. Novolac resins are more preferred.

Novolac resins are commercially available and are well known to those skilled in the art. They are typically prepared by the condensation reaction of a phenol, such as phenol, cresol, cresol, p-cresol, etc, with an aldehyde, such as formaldehyde, paraformaldehyde, acetaldehyde, etc. or a ketone, such as acetone, in the presence of an acid catalyst. Typical novolac resins include, for example, phenol-formaldehyde resins, cresol-formaldehyde resins, phenol-cresol-formaldehyde resins, p-t-butylphenol-formaldehyde resins, and pyrogallol-acetone resins. Particularly useful novolac resins are prepared by reacting m-cresol, mixtures of m-cresol and p-cresol, or phenol with formaldehyde using conventional conditions.

The imageable layer preferably comprises a dissolution inhibitor, which functions as a solubility-suppressing component for the first binder. Dissolution inhibitors have polar functional groups that comprise atoms with high electron density, preferably selected from electronegative first row elements, especially carbon, nitrogen, and oxygen. Dissolution inhibitors that are soluble in the developer are preferred.

Useful polar groups for dissolution inhibitors include, for example, diazo groups; diazonium groups; keto groups;

sulfonic acid ester groups; phosphate ester groups; triarylmethane groups; onium groups, such as sulfonium, iodonium, and phosphonium; groups in which a nitrogen atom is incorporated into a heterocyclic ring; and groups that contain a positively charged atom, especially a positively charged nitrogen atom, typically a quaternized nitrogen atom, i.e., ammonium groups. Compounds that contain a positively charged (i.e., quaternized) nitrogen atom useful as dissolution inhibitors include, for example, tetraalkyl ammonium compounds, and quaternized heterocyclic compounds such as quinolinium compounds, benzothiazolium compounds, pyridinium compounds, and imidazolium compounds. Compounds containing other polar groups, such as ether, amine, azo, nitro, ferrocenium, sulfoxide, sulfone, and disulfone may also be useful as dissolution inhibitors. The dissolution inhibitor may be a monomeric and/or polymeric compound that comprises an o-diazonaphthoquinone moiety.

A preferred group of dissolution inhibitors are triarylmethane dyes, such as ethyl violet, crystal violet, malachite green, brilliant green, Victoria blue B, Victoria blue R, Victoria blue BO, BASONYL® Violet 610, and D11 (PCAS, Longjumeau, France). These compounds can also act as contrast dyes, which distinguish the unimaged regions from the imaged regions in the developed imageable element.

Alternatively, or additionally, first binder can comprise polar groups that act as acceptor sites for hydrogen bonding with the hydroxy groups present in the first binder, and, thus, act as both the first binder and dissolution inhibitor. The level of derivatization should be high enough that the polymeric material acts as a dissolution inhibitor, but not so high that, following thermal imaging, the first binder is not soluble in the developer. Although the degree of derivatization required will depend on the nature of the first binder and the nature of the moiety containing the polar groups introduced into the polymeric material, typically about 0.5 mol % to about 5 mol %, preferably about 1 mol % to about 3 mol %, of the hydroxyl groups will be derivatized. Derivatization of phenolic resins with compounds that contain the diazonaphthoquinone moiety is well known and is described, for example, in West, U.S. Pat. Nos. 5,705,308, and 5,705,322.

One group of binders that comprise polar groups and function as dissolution inhibitors are derivatized phenolic polymeric materials in which a portion of the phenolic hydroxyl groups have been converted to sulfonic acid (sulfonate) esters, preferably phenyl sulfonates or p-toluene sulfonates. Derivatization can be carried out by reaction of the polymeric material with, for example, a sulfonyl chloride such as p-toluenesulfonyl chloride and/or with any of the other sulfonyl chlorides described above in the presence of a base such as a tertiary amine. A useful material is a novolac resin in which about 1 mol % to 3 mol %, preferably about 1.5 mol % to about 2.5 mol %, of the hydroxyl groups have been converted to phenylsulfonate or p-toluenesulfonate (tosyl) groups.

The imageable composition and imageable layer of the single layer imageable element may also comprise other ingredients such as dyes and surfactants that are conventional ingredients of imageable compositions. Surfactants may be present as, for example, coating aids. A dye may be present to aid in the visual inspection of the imaged and/or developed element. Printout dyes distinguish the imaged regions from the unimaged regions during processing. Contrast dyes distinguish the unimaged regions from the imaged regions in the developed imageable element. Preferably the dye does not absorb the imaging radiation. Triarylmethane dyes, such as described above, may also act as contrast dyes.

In single layer imageable elements, the imageable layer typically comprises about 40 wt % to about 90 wt %, preferably about 55 wt % to 75 wt %, of the first binder or mixture of first binders, based on the dry weight of the layer; about 0.5 wt % to about 30 wt %, preferably about 1 wt % to 15 wt %, of the dissolution inhibitor or mixture of dissolution inhibitors, based on the dry weight of the layer; 0.5 wt % to about 20 wt %, preferably about 1 wt % to 10 wt %, of the photothermal conversion material, based on the dry weight of the imageable layer; about 3 wt % to about 30 wt %, preferably about 5 wt % to 20 wt %, of the alkali soluble copolymer or mixture of alkali soluble copolymers, based on the dry weight of the imageable layer.

Multilayer Elements

Multilayer elements comprise a top layer or imageable layer over an underlayer. Other layers, such as an absorber layer and/or a barrier layer may also be present. When an underlayer is present, the alkali soluble copolymer or mixture of alkali soluble copolymers is in the underlayer.

Any imageable layer conventionally used in multi-layer, positive working, alkaline developable, thermally imageable elements may be used in the multilayer imageable elements. These elements are disclosed, for example, in Shimazu, U.S. Pat. Nos. 6,294,311, 6,352,812, and 6,593,055; Patel, U.S. Pat. No. 6,352,811; Hauck, U.S. Pat. No. 6,358,669; Savariar-Hauck, U.S. Pat. No. 6,528,228; and Kitson, U.S. Published Pat. Appln. 2004/0067432 A1; the disclosures of which are all incorporated herein by reference.

The imageable layer of a multilayer imageable element is over the underlayer. It becomes soluble or dispersible in the developer following thermal exposure. The imageable layer is typically similar to the imageable layer of the single layer imageable elements described above, with the exception that the alkali soluble copolymer or mixture of alkali soluble copolymers, is typically not present. It typically comprises an ink-receptive polymeric material, known as the binder, and a dissolution inhibitor. Alternatively, or additionally, the polymeric material comprises polar groups and acts as both the binder and dissolution inhibitor.

Dissolution inhibitors for the imageable layer of multilayer imageable elements are described above. The imageable layer also comprises other ingredients that are conventional ingredients of the imageable layer of multilayer imageable elements. These include, for example, surfactants and dyes, such as are described above.

Binders for the imageable layer of multilayer imageable elements are light-stable, water-insoluble, developer-soluble, film-forming phenolic resins, such as the first binders described above. In some cases, it may be desirable to include a novolac resin in the imageable layer with the highest weight average molecular weight that maintains its solubility in common coating solvents, such as acetone, tetrahydrofuran, and 1-methoxypropan-2-ol. Imageable layers comprising novolac resins, including for example m-cresol only novolac resins (i.e. those that contain at least about 97 mol % m-cresol) and m-cresol/p-cresol novolac resins that have up to 10 mol % of p-cresol, having a weight average molecular weight of about 10,000 to at least about 25,000, may be used. Imageable layers comprising m-cresol/p-cresol novolac resins with at least 10 mol % p-cresol, having a weight average molecular weight of about 8,000 to about 25,000, may also be used. In some instances, novolac resins prepared by solvent condensation may be desirable.

Imageable layers comprising these resins are disclosed in Kitson, U.S. Published Pat. Appln. 2004/0067432 A1, the disclosure of which is incorporated herein by reference.

The underlayer is between the hydrophilic surface of the substrate and the imageable layer. After imaging, it is removed along with the imageable layer by the developer in the imaged regions to reveal the underlying hydrophilic surface of the substrate. The polymeric material, which will be referred to as the second binder, in the underlayer is preferably soluble in the developer to prevent sludging of the developer. In addition, it is preferably insoluble in the solvent used to coat the imageable layer so that the imageable layer can be coated over the underlayer without dissolving the underlayer.

Polymeric materials useful as the second binder include those that contain an acid and/or phenolic functionality, and mixtures of such materials. Particularly useful polymeric materials are copolymers that comprise N-substituted maleimides, especially N-phenylmaleimide; polyvinylacetals; methacrylamides, especially methacrylamide; and acrylic and/or methacrylic acid, especially methacrylic acid. More preferably, two functional groups are present in the polymeric material, and most preferably, all three functional groups are present in the polymeric material. The preferred polymeric materials of this type are copolymers of N-phenylmaleimide, methacrylamide, and methacrylic acid, more preferably those that contain, in polymerized form, about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. Other hydrophilic monomers, such as hydroxyethyl methacrylate, may be used in place of some or all of the methacrylamide. Other alkaline soluble monomers, such as acrylic acid, may be used in place of some or all of the methacrylic acid.

These polymeric materials are soluble in alkaline developers. In addition, they are soluble in a methyl lactate/methanol/dioxolane (15:42.5:42.5 wt %) mixture, which can be used as the coating solvent for the underlayer. However, they are poorly soluble in solvents such as acetone, which can be used as solvents to coat the imageable layer on top of the underlayer without dissolving the underlayer.

The underlayer may also comprise a resin or resins having activated methylol and/or activated alkylated methylol groups. Such resins include, for example: resole resins and their alkylated analogs; methylol melamine resins and their alkylated analogs, for example melamine-formaldehyde resins; methylol glycoluril resins and alkylated analogs, for example, glycoluril-formaldehyde resins; thiourea-formaldehyde resins; guanamine-formaldehyde resins; and benzoguanamine-formaldehyde resins. Commercially available melamine-formaldehyde resins and glycoluril-formaldehyde resins include, for example, CYMEL® resins (Dyno Cyanamid) and NIKALAC® resins (Sanwa Chemical).

The resin or resins having activated methylol and/or activated alkylated methylol groups is preferably a resole resin or a mixture of resole resins. Resole resins are well known to those skilled in the art. They are prepared by reaction of a phenol with an aldehyde under basic conditions using an excess of phenol. Commercially available resole resins include, for example, GP649D99 resole (Georgia Pacific) and BKS-5928 resole resin (Union Carbide).

The underlayer typically comprises about 50 wt % to about 75 wt %, preferably about 55 wt % to 70 wt %, of the second binder or mixture of second binders, based on the dry weight of the underlayer; when present, about 5 wt % to about 20 wt %, preferably about 7 wt % to 15 wt %, of the resin or mixture of resins having activated methylol and/or activated alkylated methylol groups, based on the dry weight of the underlayer; about 5 wt % to about 25 wt %, preferably about 10 wt % to 20 wt %, of the photothermal conversion material, based on the dry weight of the underlayer; and about 3 wt % to about 30 wt %, preferably about 5 wt % to 20 wt %, of the alkali soluble copolymer or mixture of alkali soluble copolymers, based on the dry weight of the underlayer.

The underlayer of a multilayer imageable element typically comprises the photothermal conversion material. Alternatively, the photothermal material may be in the imageable layer or in a separate absorber layer.

When an absorber layer is present, it is between the imageable layer and the substrate. When an underlayer is also present, the absorber layer is between the imageable layer and the underlayer. The absorber layer preferably consists essentially of the photothermal conversion material and, optionally, a surfactant. It may be possible to use less of the photothermal conversion material if it is present in a separate absorber layer rather than either the underlayer and/or the imageable layer. When an absorber layer is present, the imageable layer is preferably substantially free of photothermal conversion material, i.e. the imageable layer preferably does not absorb radiation used for imaging, typically radiation in the range of 800 nm to 1200 nm. The absorber layer preferably has a thickness sufficient to absorb at least 90%, preferably at least 99%, of the imaging radiation. Typically, the absorber layer has a coating weight of about 0.02 g/m$^2$ to about 2 g/m$^2$, preferably about 0.05 g/m$^2$ to about 1.5 g/m$^2$. Elements that comprise an absorber layer are disclosed in Shimazu, U.S. Pat. No. 6,593,055.

To minimize migration of the photothermal conversion material from the underlayer to the imageable layer during manufacture and storage of the imageable element, the element may comprise a barrier layer between the underlayer and the imageable layer. The barrier layer comprises a polymeric material that is soluble in the developer. If this polymeric material is different from the polymeric material in the underlayer, it is preferably soluble in at least one organic solvent in which the polymeric material in the underlayer is insoluble. A preferred polymeric material for the barrier layer is polyvinyl alcohol. When the polymeric material in the barrier layer is different from the polymeric material in the underlayer, the barrier layer should be less than about one-fifth as thick as the underlayer, preferably less than a tenth of the thickness of the underlayer.

Preparation of the Imageable Element

Single layer imageable elements may be prepared by applying the imageable layer to the substrate using conventional techniques, such as coating or lamination. Typically, the ingredients are dissolved in an appropriate coating solvent, and the resulting mixture coated onto the hydrophilic surface of substrate by conventional methods, such as spin coating, bar coating, gravure coating, die coating, or roller coating.

Multi-layer imageable elements may be prepared by sequentially applying the underlayer over the hydrophilic surface of the substrate; applying the absorber layer or the barrier layer if present, over the underlayer; and then applying the imageable layer using conventional techniques. Typically the ingredients are dispersed or dissolved in a suitable coating solvent, and the resulting mixture coated by conventional methods, such as spin coating, bar coating, gravure coating, die coating, or roller coating. The underlayer may be applied, for example, from mixtures of methyl ethyl ketone, 1-methoxypropan-2-ol, butyrolactone, and water; from mixtures of diethyl ketone, water, methyl lactate, and butyrolactone; and from mixtures of diethyl ketone, water, and methyl lactate.

When neither a barrier layer nor an absorber layer is present, the imageable layer is coated on the underlayer. To prevent the underlayer from dissolving and mixing with the imageable layer, the imageable layer should be coated from a solvent in which the underlayer layer is essentially insoluble. Thus, the coating solvent for the imageable layer should be a solvent in which the components of the imageable layer are sufficiently soluble that the imageable layer can be formed and in which any underlying layers are essentially insoluble. Typically, the solvents used to coat the underlying layers are more polar than the solvent used to coat the imageable layer. The imageable layer may be applied, for example, from diethyl ketone, or from mixtures of diethyl ketone and 1-methoxy-2-propyl acetate. An intermediate drying step, i.e., drying the underlayer, if present, to remove coating solvent before coating the imageable layer over it, may also be used to prevent mixing of the layers.

Alternatively, the underlayer, the imageable layer or both layers may be applied by conventional extrusion coating methods from a melt mixture of layer components. Typically, such a melt mixture contains no volatile organic solvents.

Imaging and Processing

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers, the GS618-400 thermal plotter (Oyo Instruments, Houston, Tex., USA), or the Model VP-3500 thermal printer (Seikosha America, Mahwah, N.J., USA).

Imaging produces an imaged element, which comprises a latent image of imaged regions and complementary unimaged regions. Development of the imaged element to form a printing plate, or printing form, converts the latent image to an image by removing the imaged regions, revealing the hydrophilic surface of the underlying substrate.

Suitable developers depend on the solubility characteristics of the ingredients present in the imageable element. The developer may be any liquid or solution that can penetrate and remove the imaged regions of the imageable element without substantially affecting the complementary unimaged regions. While not being bound by any theory or explanation, it is believed that image discrimination is based on a kinetic effect. The imaged regions of the imageable layer are removed more rapidly in the developer than the unimaged regions. Development is carried out for a long enough time to remove the imaged regions of the imageable layer and the underlying regions of the other layer or layers of the element, but not long enough to remove the unimaged regions of the imageable layer. Hence, the imageable layer is described as being "not removable" by, or "insoluble" in, the developer prior to imaging, and the imaged regions are described as being "soluble" in, or "removable" by, the developer because they are removed, i.e. dissolved and/or dispersed, more rapidly in the developer than the unimaged regions. Typically, the underlayer is dissolved in the developer and the imageable layer is dissolved and/or dispersed in the developer.

High pH developers can be used. High pH developers typically have a pH of at least about 11, more typically at least about 12, even more typically from about 12 to about 14. High pH developers also typically comprise at least one alkali metal silicate, such as lithium silicate, sodium silicate, and/or potassium silicate, and are typically substantially free of organic solvents. The alkalinity can be provided by using a hydroxide or an alkali metal silicate, or a mixture. Preferred hydroxides are ammonium, sodium, lithium and, especially, potassium hydroxides. The alkali metal silicate has a $SiO_2$ to $M_2O$ weight ratio of at least 0.3 (where M is the alkali metal), preferably this ratio is from 0.3 to 1.2, more preferably 0.6 to 1.1, most preferably 0.7 to 1.0. The amount of alkali metal silicate in the developer is at least 20 g $SiO_2$ per 100 g of composition and preferably from 20 to 80 g, most preferably it is from 40 to 65 g. High pH developers can be used in an immersion processor. Typical high pH developers include PC9000, PC3000, Goldstar™, Greenstar™, ThermalPro™, PROTHERM®, MX 1813, and MX1710, aqueous alkaline developers, all available from Kodak Polychrome Graphics LLC. Another useful developer contains 200 parts of Goldstar™ developer, 4 parts of polyethylene glycol (PEG) 1449, 1 part of sodium metasilicate pentahydrate, and 0.5 part of TRITON® H-22 surfactant (phosphate ester surfactant).

Following development, the resulting printing plate is rinsed with water and dried. Drying may be conveniently carried out by infrared radiators or with hot air. After drying, the printing plate may be treated with a gumming solution comprising one or more water-soluble polymers, for example polyvinylalcohol, polymethacrylic acid, polymethacrylamide, polyhydroxyethylmethacrylate, polyvinylmethylether, gelatin, and polysaccharide such as dextrine, pullulan, cellulose, gum arabic, and alginic acid. A preferred material is gum arabic.

The developed and gummed plate is baked to increase the press runlength of the plate. Baking can be carried out, for example, at about 220° C. to about 260° C. for about 5 minutes to about 15 minutes, or at a temperature of about 110° C. to about 130° C. for about 25 to about 35 min.

INDUSTRIAL APPLICABILITY

Once a lithographic printing plate precursor has been imaged and developed to form a lithographic printing plate, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

Except where indicated, the indicated percentages are percentages by weight based on the total solids in the coating solution.

| Glossary | |
|---|---|
| AIBN | Azobisisobutyronitrile (DuPont, Wilmington, Delaware, USA) |
| Astro Mark III | Fountain solution (Dainippon Ink and Chemical, Tokyo, Japan) |
| BC | 1-Butoxyethanol (Butyl CELLOSOLVE ®) |
| Crystal Violet | C.I. 42555, Basic Violet 3; $\lambda_{max}$ = 588 nm [(p-$(CH_3)_2C_6H_4)_3^+Cl^-$] |
| BYK-307 | Polyethoxylated dimethyl-polysiloxane copolymer (BYK Chemie, Wallingford, CT, USA) |
| CBS011 | Copolymer, see structure below (Example 9) |
| CREO ® Trendsetter 3230 | Commercially available platesetter, using Procom Plus software and operating at a wavelength of 830 nm (Creo Products, Burnaby, BC, Canada) |
| Copolymer 1 | Copolymer containing 41.5 mol % N-phenylmaleimide, 21 mol % methacrylic acid, and 37.5% methacrylamide |
| DAA | Diacetone alcohol |
| DMF | Dimethyl formamide |
| ELECTRA EXCEL ® | Thermally sensitive, positive working, single layer, conditioned, inhibited novolac-containing plate printing plate precursor (Kodak Polychrome Graphics, Norwalk, CT, USA). |
| Ethyl violet | C.I. 42600; CAS 2390-59-2 ($\lambda_{max}$ = 596 nm) [(p-$(CH_3CH_2)_2NC_6H_4)_3C^+Cl^-$] (Aldrich, Milwaukee, WI, USA) |
| EUV-5 | Copolymer containing 5 wt % N-phenylmaleimide; 10 wt % methacrylamide; 48 wt % acrylonitrile; 31 wt % $H_2C=C(CH_3)-CO_2-CH_2CH_2-NH-CO-NH-p-C_6H_4-OH$; and 6 wt % $H_2C=C(CH_3)-CO_2-NH-p-C_6H_4-OH$ |
| Goldstar ™ Developer | Sodium metasilicate based aqueous alkaline developer (Kodak Polychrome Graphics, Norwalk, CT, USA) |
| GP649D99 | Resole resin (Georgia-Pacific, Atlanta, GA, USA). |
| IR Dye A | Infrared absorbing dye ($\lambda_{max}$ = 830 nm) (Eastman Kodak, Rochester, NY, USA) (see structure above) |
| IR Dye C | 2-[2-[2-Chloro-3-[(1,3-dihydro-1,3,3-trimethyl-2H-indol-2-ylidene)ethylidene]-1-cyclohexen-1-yl]ethenyl]-1,3,3-trimethyl-3H-Indolium bromide |

| Glossary (-continued) | |
|---|---|
| | (Honeywell Specialty Chemicals, Morristown, NJ, USA) |
| Interleaving | Polythene coated paper No. 22; 6 g/m² (Thilmany, Kaukauna, WI, USA) |
| Kraft paper | Unbleached, unglazed Kraft 90 g/m², coated with matte black low density polythene 20 g/m² (Thilmany, Kaukauna, WI, USA) |
| LB6564 | Phenol/cresol novolac resin (Rutgers-Plenco LLC, Sheboygan, WI, USA) |
| N-13 | Novolac resin; 100% m-cresol; MW 13,000 (Eastman Kodak Rochester, NY, USA) |
| RAR-62 | Copolymer containing 5 wt % N-phenylmaleimide; 10 wt % methacrylamide; 45 wt % acrylonitrile; 40 wt % $H_2C=C(CH_3)-CO_2-CH_2CH_2-NH-CO-NH-p-C_6H_4-OH$ |
| SILIKOPHEN ® P50X | Phenylmethyl polysiloxane resin (Tego Chemie Service, Essen, Germany) |
| Substrate A | 0.3 mm gauge, aluminum sheet which had been electrograined, anodized and treated with a solution of inorganic phosphate |
| m-TMI | 1-(1-isocyanato-1-methyl)-ethyl 3-(1-methyl)-ethenyl benzene |
| TN-13 | N-13 novolac resin functionalized with p-toluene sulfonyl chloride |

Example 1

This example illustrates preparation of the t-BOC derivative of RAR-62 (t-BOC RAR-62). RAR-62 (29.95 g), dioxolane (135.8 g) and DMF (40 g) were allowed to dissolve in a flask. Di-t-butyidicarbonate (10.00 g), potassium carbonate (6.50 g), and 18-crown-6 (2.0 g) were next added over 30 minutes. The mixture was stirred for two hours at room temperature. The product (37.5 g, 98.2% yield) was isolated by precipitation into water and was dried for 2 days at 50° C.

IR: 3376 cm$^{-1}$ (s) NH, 1810 & 1758 cm$^{-1}$ (s) C=O from t-BOC, 1670 cm$^{-1}$ (s) N—CO—N, 1119 & 1069 cm$^{-1}$ (s) C=O stretch, 845 cm$^{-1}$ (s) —O—C(O)—O—, 576 cm$^{-1}$ (m) CN. $^1$H NMR (in DMSO-d$_6$): δ 1.40 (9H, m). No peak was observed at δ 8.20. In comparison, RAR-62 has a peak at δ 8.20 (1H, s).

Example 2

This example illustrates the synthesis of the t-BOC derivative of EUV-5 (t-BOC EUV-5). EUV-5 (29.95 g), dioxolane (135.8 g) and DMF (40 g) were allowed to dissolve in a flask. Di-t-butyldicarbonate (10.00 g), potassium carbonate (6.50 g) and 18-crown-6 (2.0 g) were next added over 30 minutes. The mixture was stirred for two hours at room temperature. The product (37.4 g, 97.9% yield) was isolated by precipitation into water and was dried for 2 days at 50° C. IR: 3373 cm$^{-1}$ (s) NH, 1812 & 1760 cm$^{-1}$ (s) C=O from t-BOC, 1670 cm$^{-1}$ (s) N—CO—N, 1119 & 1070 cm$^{-1}$ (s) C=O stretch, 845 cm$^{-1}$ (s) —O—C(O)—O—, 576 cm$^{-1}$ (m) CN. $^1$H NMR (in DMSO-d$_6$): δ 1.40 (9H, m). No peak was observed at δ 8.20. In comparison, EUV-5 has a peak δ 8.20 (1H, s).

Examples 3 and 4 and Comparative Examples 1 and 2

This Example illustrates single layer imageable elements. Coating solutions were prepared by dissolving the materials listed in Table 1 in 2-butanone/1-methoxy-propan-2-ol/butyrolactone/water (65/15/10/10). Each coating solution was coated onto substrate A using a wire wound bar. The resulting imageable elements, consisting of an imageable layer over the substrate, were dried at 100° C. for 90 seconds in a Mathis Labdryer LTE oven (Werner Mathis, Switzerland). The dry weight of each imageable layer was 1.5 g/m$^2$.

TABLE 1

| | Example No. | | | |
|---|---|---|---|---|
| | C1 | 3 | C2 | 4 |
| Component | Parts by Weight | | | |
| RAR-62 | 20 | — | — | — |
| t-BOC RAR-62 | — | 20 | — | — |
| EUV-5 | — | — | 20 | — |
| t-BOC EUV-5 | — | — | — | 20 |
| N-13 | 20 | 20 | 20 | 20 |
| LB6564 | 50.65 | 50.65 | 50.65 | 50.65 |
| Crystal Violet | 2 | 2 | 2 | 2 |
| IR dye A | 2 | 2 | 2 | 2 |
| SILIKOPHEN ® P50X | 5 | 5 | 5 | 5 |
| BYK 307 | 0.35 | 0.35 | 0.35 | 0.35 |

The imageable elements were covered with interleaving, wrapped in Kraft paper and placed in an oven with a fan at 55° C. for 3 days. The resulting heat-treated imageable elements were imaged with an internal test pattern (plot 0) using a CREO® Trendsetter 3244 (Creo Inc., Burnaby, British Columbia, Canada) at imaging energy densities of 100, 150 and 200 mJ/cm$^2$. The imaged imageable elements were developed in a Mercury Mark V processor (immersion processor, Kodak Polychrome Graphics, Norwalk, Conn., USA), containing Goldstar™ developer at 23.5° C. at processing speeds of 500 and 1500 mm/min. The imageable elements were evaluated for clean out (first imaging exposure where imaged regions dissolve completely in developer) and best resolution (imaging energy at which the imageable element gives the best image).

Additional imageable elements were imaged with a 50% checkerboard pattern at 200 mJ/cm$^2$ and then processed in the Mercury processor as above at a processing speed of 750 mm/min. Sections of the 50% image region and no exposure regions (100% solid image) were soaked in Astro Mark III fountain solution/2-propanol/water (Jun. 10, 1984), for 8 hours and for 24 hours. After the images had been rubbed gently with a cotton pad to remove any loose debris, rinsed in water, and dried, they were read with a D196 densitometer (Gretag MabcBeth, Regensdorf, Switzerland). The results are shown in Table 2.

TABLE 2

| | Minimum exposure required for: | | | |
|---|---|---|---|---|
| | Clean Out (mJ/cm$^2$) | | Best Resolution (mJ/cm$^2$) | |
| | 500 mm/min | 1500 mm/min | 500 mm/min | 1500 mm/min |
| C1 | No image | No image | No image | No image |
| 3 | <100 | <100 | 150 | 150 |
| C2 | No image | No image | No image | No image |
| 4 | <100 | <100 | 150 | 150 |

| | Dot size after soaking in Astro/2-propanol/water for: | | | | | |
|---|---|---|---|---|---|---|
| | 0 hours | | 8 hours | | 24 hours | |
| | 50% | 100% | 50% | 100% | 50% | 100% |
| C1 | 51 | 100 | 49 | 100 | 48 | 100 |
| 3 | 52 | 100 | 52 | 100 | 49 | 100 |
| C2 | 51 | 100 | 49 | 100 | 49 | 100 |
| 4 | 53 | 100 | 53 | 100 | 51 | 100 |

| | Deletion Test | |
|---|---|---|
| | Baked at 210° C.[a] | Baked at 230° C. |
| C1 | 2 | 1 |
| 3 | 2 | 1 |
| C2 | 5 | 2 |
| 4 | 5 | 1 |

[a] 1 = none of the imageable layer removed; 5 = 50% of the imageable layer removed Examples 5 and 6 and Comparative Examples 3 and 4

This Example illustrates multilayer imageable elements.

Underlayer: Coating solutions were prepared by dissolving the materials listed in Table 3 in 2-butanone/1-methoxy-propan-2-ol/butyrolactone/water (65/15/10/10). Each coating solution was coated onto substrate A using a wire wound bar. The resulting element consisting of the underlayer over the substrate was dried at 135° C. for 35 seconds. The dry coating weight of the underlayer was 1.3 g/m$^2$.

TABLE 3

| | Example No. | | | |
|---|---|---|---|---|
| | C3 | 5 | C4 | 6 |
| Component | Parts by Weight | | | |
| RAR-62 | 15 | — | — | — |
| t-BOC RAR-62 | — | 15 | — | — |
| EUV-5 | — | — | 15 | — |
| t-BOC EUV-5 | — | — | — | 15 |
| Copolymer 1 | 59.65 | 59.65 | 59.65 | 59.65 |
| GP649D99 | 10 | 10 | 10 | 10 |
| IR dye A | 15 | 15 | 15 | 15 |
| BYK 307 | 0.35 | 0.35 | 0.35 | 0.35 |

Imageable layer: A coating solution containing 99.35 parts by weight of the functionalized novolac resin formed in Example 7, 0.3 parts by weight of ethyl violet, and 0.35 parts by weight of BYK-307 in diethyl ketone/1-methoxypropyl acetate (92:8, w:w) was coated onto each underlayer, using a wire wound bar. Each resulting imageable element was dried at 135° C. for 35 seconds. The dry coating weight of the imageable layer was 0.9 g/m$^2$.

The resulting imageable elements were evaluated in the following tests:

Clean out and best resolution Imageable elements were imaged with 830 nm radiation with an internal test pattern (plot 0), on a CREO® 3230 Trendsetter at 83, 86, 93, 99, 107, 116, 127 and 140 mJ/cm² and 9 Watts laser power. The imaged imageable elements were then machine processed with Goldstar™ developer in a Mercury Mark V processor (750 mm/min processing speed, 23.5° C. developer temperature). The imageable elements were evaluated for clean out (first imaging exposure where imaged regions dissolve completely in developer) and best resolution (imaging energy at which the imageable element gives the best image).

Developer drop test on underlayer only A large drop of Goldstar™ developer was placed on the underlayer of each element at 22° C. and the time required to dissolve the layer was noted.

Developer drop test on complete imageable element: A large drop of Goldstar™ developer was placed on each imageable element at 22° C. and the time required to dissolve the layers was noted.

Solvent resistance drop test on complete imageable element: A large drop of either diacetone alcohol/water (80:20, v:v) or 1-butoxyethanol/water (80:20, v:v) was placed on the imageable layer of each of the imageable elements at 22° C. The time required to dissolve the layers was noted, and the amount of material removed after 1 minute was assessed.

Baking test followed by deletion gel: Imageable elements were baked at 210° C. and 230° C. for 8 minutes in a Mathis LTE Labdryer oven (Werner Mathis, Switzerland, fan speed of 1000 rpm). Then a Kodak Polychrome Graphics positive deletion gel, which contains hydrofluoric acid, was applied to the baked imageable layer for 12 minutes, and the amount of the imageable layer remaining after this time was assessed (1=no imageable layer removed, 5=50% of the imageable layer removed).

The results are shown in Table 4.

TABLE 4

| Exp. | Goldstar ™ Drop Tests (sec) | | Minimum exposure required for: | | Solvent resistance drop test (sec) | |
|---|---|---|---|---|---|---|
| | Under layer | Complete element | Clean out (mJ/cm²) | Resolution (mJ/cm²) | DAA/- water | BC/- water |
| C3 | 10 | 180 | 116 | 127 | 210 | >300 |
| 5 | 14 | 210 | 107 | 116 | 180 | 300 |
| C4 | 12 | 210 | 127 | 127 | 300 | >300 |
| 6 | 16 | 210 | 116 | 127 | 270 | 300 |

| | Deletion Test | |
|---|---|---|
| | Baked at 210° C.[a] | Baked at 230° C. |
| C3 | 1 | 1 |
| 5 | 2 | 2 |
| C4 | 2 | 1 |
| 6 | 3 | 2 |

[a]1 = none of the imageable layer removed; 5 = 50% of the imageable layer removed

Example 7

This example illustrates preparation of a novolac resin functionalized with p-toluenesulfonyl chloride. N-13 (24 g, 199.75 millimoles) was added in acetone (66 g) with stirring and the resulting mixture cooled to 10° C. in an ice/water bath. p-Toluenesulfonyl chloride was added (20.02 millimoles) at 10° C. over 1 min. Triethylamine (19.63 millimoles) was added at 10° C. over 2 min. The reaction mixture was stirred for 10 min at less than 15° C. Acetic acid (8.33 millimoles) was added at 10° C. over 10 sec, and the reaction mixture stirred for 15 min. Water/ice (160 g), and acetic acid (1.2 g, 20.02 millimoles) was added over several minutes at 15° C. and the reaction mixture stirred below 15° C. for 5 min.

The supernatant was decanted from the tacky solid that formed in the bottom of the reaction flask. Acetone (354 g) was added, and the reaction mixture stirred until a clear solution was obtained. Water/ice (160 g) and acetic acid (1.2 g, 20.02 millimoles) were added over several minutes and the reaction mixture stirred for 5 min below 15° C. The supernatant was decanted from the tacky solid. Additional acetone (354 g) was added and the reaction mixture stirred until a clear solution was obtained. 25% of the acetone solution was added to a mixture of ice (460 g), water (460 g) and acetic acid (0.5 g). The resulting mixture was stirred for 20 minutes, the precipitate allowed to settle, and the supernatant decanted. The process was repeated with the rest of the acetone solution. The damp polymer fractions were combined, washed twice with water (460 g), and dried. Yield: 88%.

Example 8

This example illustrates preparation of Copolymer 1, a copolymer containing 41.5 mol % N-phenylmaleimide, 21 mol % methacrylic acid, and 37.5% methacrylamide. N-Phenylmaleimide (23.59 g), methacrylic acid (5.93 g), methacrylamide (10.48 g) and dioxolane/ethanol (50:50 (v:v); 126.01 g) were placed in a 1 L reaction kettle fitted with a reflux condenser, nitrogen supply, thermometer, stirrer, and heating mantle. Nitrogen was bubbled through the reaction mixture for one hour. The reaction was heated to 60° C. under nitrogen and 2,2-azobisisobutyronitrile (AIBN) (0.054 g in 10 g of dioxolane/ethanol) was added.

The reaction mixture was stirred under nitrogen at 60° C. for about 20 hr. The reaction mixture was slowly added to water (about 1 L), and the resulting precipitate filtered. The precipitate was washed with about 1 L of 80:20 ethanol/water containing about 5 drops of concentrated hydrochloric acid, filtered again, washed with about 1 L of 80:20 ethanol/water, filtered again, and dried for two days at 50° C. Yield: 80%.

Example 9

This example illustrates the preparation of a copolymer of the invention.

Monomer Preparation

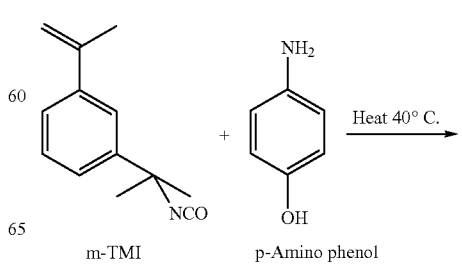

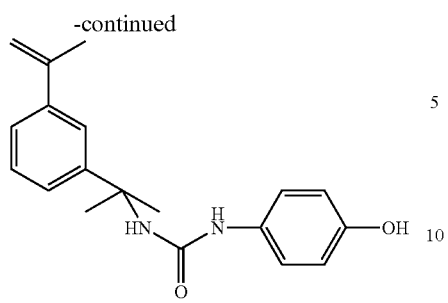

50.23 g of m-TMI was charged into a four necked 500 ml flask, equipped with a heating mantle, temperature controller, mechanical stirrer, condenser, and nitrogen inlet. The reaction mixture was heated to 30° C. under a nitrogen atmosphere. Then a mixture of 234.2 g of dimethylacetamide and 27.82 g of p-aminophenol was added at 30° C. Two hours later the temperature was raised slowly to 40° C. The progress of the reaction was monitored by disappearance of the NCO absorption at 2275 cm$^{-1}$.

Preparation of CBS011

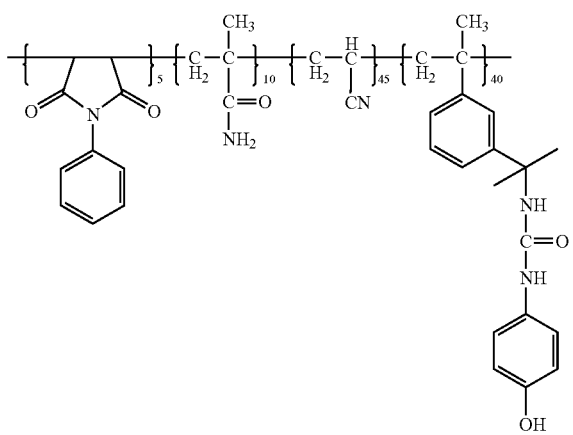

A mixture of N-phenylmaleimide (2.00 g), acrylonitrile (18.00 g), methacrylamide (4.00 g), the monomer prepared in the previous step (16.00 g), and dioxolane/ethanol (50:50 (v:v); 126.01 g) was heated under nitrogen for 1 hr in a 1 L reaction kettle fitted with a Liebig condenser, a nitrogen supply, a thermometer, a stirrer, and a heating mantle. AIBN (0.054 g) in dioxolane/ethanol (10 g) was added to the reaction mixture and stirring under nitrogen at 60° C. was continued for about 20 hr. The resulting reaction mixture was added slowly, with stirring, to water (1000 ml) containing 5 drops of hydrochloric acid. The resulting precipitate was filtered, washed (1000 ml ethanol/water (80:20)), and filtered again. It was dried for 2 days at 50° C. to produce CBS011.

Preparation of the t-BOC Polymer

CBS011 (29.95 g) was dissolved in a mixture of dioxolane (135.8 g) and DMF (40 g). Di-t-butyldicarbonate (10.00 g), potassium carbonate (6.50 g) and 18-crown-6 (2.0 g) were added over 0.5 hr, and the resulting mixture was stirred for 2 hr at room temperature. The product (37.0 g, 97.1% yield) (t-BOC CBS011) was isolated by precipitation into water and was dried for 2 days at 50° C. $^1$H NMR (in DMSO-d$_6$): δ 1.50 (9H, m). No peak at δ 8.10 in comparison to CBS011 δ 8.10 (1H, s).

Example 10

The procedure of Example 3 and 4 was repeated, except that the coating solution contained the ingredients listed in Table 5. The dry weight of the imageable layer was 1.5 g/m$^2$.

TABLE 5

| Component | Parts by Weight |
| --- | --- |
| t-BOC CBS011 | 17.25 |
| N13 | 30.82 |
| LB6564 | 41.65 |
| Crystal Violet | 1.99 |
| IR dye A | 1.46 |
| IR dye C | 0.47 |
| SILIKOPHEN ® P50X | 5.96 |
| BYK 307 | 0.40 |

The resulting imageable elements were stored at 55° C. for 3 days as in Example 3. The resulting heat-treated imageable elements were imaged with an internal test pattern (plot 0) using a CREO® Trendsetter 3244 (Creo Inc., Burnaby, British Columbia, Canada) at imaging energy densities of 100, 200 and 300 mJ/cm$^2$ and developed and evaluated for clean out and best resolution as in Example 3.

Additional imageable elements were imaged with a 50% checkerboard pattern at 200 mJ/m$^2$ and then processed as described above at a processing speed of 750 mm/min. Dot size after soaking in Astro/2-propanol/water was determined as in Example 3. The results are shown in Table 6.

TABLE 6

| Minimum exposure required for: | | | |
| --- | --- | --- | --- |
| Clean Out (mJ/cm$^2$) | | Best Resolution (mJ/cm$^2$) | |
| 500 mm/min | 1000 mm/min | 500 mm/min | 1000 mm/min |
| 200 | 200 | 200 | 200 |
| Dot size after soaking in Astro/2-propanol/water for: | | | | | |
| 0 hours | | 8 hours | | 24 hours | |
| 50% | 100% | 50% | 100% | 50% | 100% |
| 51 | 100 | 51 | 100 | 48 | 100 |

Example 11

This example illustrates preparation of the p-toluenesulfonate derivative of RAR-62 (tosyl RAR-62). RAR-62 (29.95 g) was dissolved in dioxane (135.8 g) and DMF (40 g). The resulting mixture was cooled to below 10° C. in an ice bath and was held below 10° C. while p-toluene sulfonyl chloride (8.66 g) was added over ten minutes and then triethylamine (4.95 g) was added over fifteen minutes. The mixture was stirred for 15 min at a temperature less than 15° C. Acetic acid (2.77 g) was added over a 10 sec, and the mixture stirred for another 15 min.

An acidified (acetic acid, 2.77 g) ice/water mixture (300 g) was added to the mixture over several minutes, and the reaction mixture stirred for five minutes. A tacky, gooey mass is formed. After the contents were allowed to settle, the supernatant was decanted. The tacky mass was dissolved in dioxolane/water (80:20) and poured into a second acidified ice/water mixture. The resulting white precipitate (tosyl RAR-62) was filtered off and dried. Yield=34.95 g (73.7%). IR: 3379 cm$^{-1}$ (s) NH, 1670 cm$^{-1}$ (s) N—CO—N, 1367 cm$^{-1}$ (s) —SO$_2$—O—, 1308 cm$^{-1}$ (s) —SO$_2$—, 1197 & 1173 cm$^{-1}$ (s) —SO$_2$—O—, 1093 cm$^{-1}$ (vs) —SO$_2$—, 563 cm$^{-1}$ (s) —SO$_2$—. $^1$H NMR (in DMSO-d$_6$): δ 6.80 (4H, s). No peak was observed at δ 8.20. In comparison, RAR-62 has a peak δ 8.20 (1H, s).

Example 12

This example illustrates the synthesis of the p-toluenesulfonate derivative of EUV-5 (tosyl EUV-5). The procedure of Example 11 was repeated except that EUV-5 (29.95 g) replaced RAR-62 and the following amounts of other materials were used: p-toluenesulfonyl chloride (6.71 g), triethylamine (3.56 g) and acetic acid (2.15 g). Yield=33.50 g, 70.7%. IR: 3376 cm$^{-1}$ (s) NH, 1672 cm$^{-1}$ (s) N—CO—N, 1369 cm$^{-1}$ (s) —SO$_2$—O—, 1309 cm$^{-1}$ (s) —SO$_2$—, 1197 & 1173 cm$^{-1}$ (s) —SO$_2$—O—, 1093 cm$^{-1}$ (vs) —SO$_2$—, 564 cm (s) —SO$_2$—. $^1$H NMR (in DMSO-d$_6$): δ 6.80 (4H, s). No peak was observed at δ 8.20. In comparison, EUV-5 has a peak δ 8.20 (1H, s).

Examples 13 and 14 and Comparative Examples 5 and 6

Underlayer: Coating solutions were prepared by dissolving the materials listed in Table 7 in 2-butanone/1-methoxy-propan-2-ol/butyrolactone/water (65/15/10/10). Each coating solution was coated onto Substrate A using a wire wound bar. The resulting element consisting of the underlayer over the substrate was dried at 135° C. for 35 seconds. The dry coating weight of the underlayer was 1.3 g/m$^2$.

TABLE 7

| Component | C5 | 13 | C6 | 14 |
|---|---|---|---|---|
| | | Example No. Parts by Weight | | |
| RAR-62 | 15 | — | — | — |
| Tosyl RAR-62 | — | 15 | — | — |
| EUV-5 | — | — | 15 | — |
| tosyl EUV-5 | — | — | — | 15 |
| Copolymer 1 | 59.65 | 59.65 | 59.65 | 59.65 |
| GP649D99 | 10 | 10 | 10 | 10 |
| IR dye A | 15 | 15 | 15 | 15 |
| BYK 307 | 0.35 | 0.35 | 0.35 | 0.35 |

Imageable layer: The imageable layer was formed as in Example 5, except that functionalized novolac resin TN-13 was used. The dry coating weight of the imageable layer was 0.9 g/m$^2$. The resulting imageable elements were evaluated as in Example 5. The results are shown in Table 8.

TABLE 8

| Exp. | Goldstar ™ Drop Tests (sec) | | Minimum exposure required for: | | Solvent resistance drop test (sec) | |
|---|---|---|---|---|---|---|
| | Under layer | Complete element | Clean out (mJ/cm$^2$) | Best Resolution (mJ/cm$^2$) | DAA/- water | BC/- water |
| C5 | 12 | 180 | 115 | 126 | 240 | 300 |
| 13 | 12 | 180 | 115 | 126 | 210 | 270 |
| C6 | 12 | 210 | 106 | 126 | 210 | 330 |
| 14 | 12 | 210 | 98 | 115 | 210 | 330 |

TABLE 8-continued

Deletion Test

| | Baked at 210° C.[a] | Baked at 230° C. |
|---|---|---|
| C5 | 3 | 2 |
| 13 | 4 | 2 |
| C6 | 3 | 2 |
| 14 | 3 | 2 |

[a]1 = none of the imageable layer removed; 5 = 50% of the imageable layer removed Examples 15 and 16 and Comparative Examples 7 and 8

This Example illustrates single layer imageable elements. Imageable elements were prepared as in Example 3 using materials listed in Table 9. The dry weight of each imageable layer was 1.5 g/m$^2$.

TABLE 9

| Component | C7 | 15 | C8 | 16 |
|---|---|---|---|---|
| | | Example No. Parts by Weight | | |
| RAR-62 | 10 | — | — | — |
| tosyl RAR-62 | — | 10 | — | — |
| EUV-5 | — | — | 10 | — |
| tosyl EUV-5 | — | — | — | 10 |
| N-13 | 20 | 20 | 20 | 20 |
| LB6564 | 60.65 | 60.65 | 60.65 | 60.65 |
| Crystal Violet | 2 | 2 | 2 | 2 |
| IR dye A | 2 | 2 | 2 | 2 |
| SILIKOPHEN ® P50X | 5 | 5 | 5 | 5 |
| BYK 307 | 0.35 | 0.35 | 0.35 | 0.35 |

The imageable elements were evaluated as in Example 3. The results are shown in Table 10.

TABLE 10

| | Minimum exposure required for: | | | |
|---|---|---|---|---|
| | Clean Out (mJ/cm$^2$) | | Best Resolution (mJ/cm$^2$) | |
| | 500 mm/min | 1500 mm/min | 500 mm/min | 1500 mm/min |
| C7 | 150 | 150 | 150 | 150 |
| 15 | 150 | 150 | 150 | 150 |
| C8 | 150 | 150 | 150 | 150 |
| 16 | 150 | 150 | 150 | 150 |

| | Dot size after soaking in Astro/2-propanol/water for: | | | |
|---|---|---|---|---|
| | 0 hours | | 24 hours | |
| | 50% | 100% | 50% | 100% |
| C7 | 50 | 100 | 52 | 100 |
| 15 | 52 | 100 | 52 | 100 |
| C8 | 50 | 100 | 52 | 100 |
| 16 | 54 | 100 | 52 | 100 |

Deletion Test

| | Baked at 210° C.[a] | Baked at 230° C. |
|---|---|---|
| C7 | 3 | 2 |
| 15 | 3 | 2 |

TABLE 10-continued

| | | |
|---|---|---|
| C8 | 3 | 2 |
| 16 | 3 | 2 |

[a]1 = none of the imageable layer removed; 5 = 50% of the imageable layer removed Having described the invention, we now claim the following and their equivalents.

What is claimed is:

1. A copolymer comprising, in polymerized form:
   (a) about 1 wt % to about 30 wt % of N-phenylmaleimide, N-cyclohexylmaleimide, N-benzylmaleimide, or a mixture thereof;
   (b) about 1 wt % to about 30 wt % of acrylamide, methacrylamide, or a mixture thereof;
   (c) about 20 wt % to about 75 wt % of acrylonitrile, methacrylonitrile, or a mixture thereof; and
   (d) a total of about 20 wt % to about 75 wt % of one or more monomers selected from the group consisting of monomers of the structure:

CH$_2$=C(R)-Z-X—NHC(O)NH—Y—R' in which:
   X is —[C(CH$_3$)$_2$]— or —[(CH$_2$)$_n$]—, in which n is 0 to 12;
   Y is o-, m-, or p-—[C$_6$H$_4$]—;
   Z is —[C(O)O]—, —[C(O)NH]—, or o-, m-, or p-[—C$_6$H$_4$]—;
   R is hydrogen or C$_1$ to C$_4$ alkyl;
   R' is —OC(O)—OR", —OC(O)—Ar, or —OSO$_2$—Ar;
   R" is C$_1$ to C$_{12}$ alkyl, C$_1$ to C$_{12}$ arylalkyl, C$_1$ to C$_{12}$ aryl, C$_1$ to C$_{12}$ alkenyl, trimethylsilyl;
   Ar is C$_6$H$_{5-n'}$T$_{n'}$, in which Ar has a total of six to ten carbon atoms;
   each T is independently selected from the group consisting of C$_1$ to C$_4$ alkyl, fluoro, chloro, bromo, iodo, trifluoromethyl, methoxy, and cyano; and
   n' is an integer from 0 to 5; and
   in which the copolymer is soluble in alkaline solutions having a pH greater than at least about 11.

2. The copolymer of claim 1 in which the copolymer comprises, in polymerized form, about 3 wt % to about 20 wt % of N-phenylmaleimide; about 5 wt % to about 2 wt % of methacrylamide; about 35 wt % to about 60 wt % of acrylonitrile; and a total of about 30 wt % to about 60 wt % of the one or more group (d) monomers, and in which the copolymer is soluble in alkaline solutions having a pH greater than at least about 12.

3. The copolymer of claim 1 in which R' is —OC(O)—OR".

4. The copolymer of claim 3 in which R" is t-butyl.

5. The copolymer of claim 3 in which R is hydrogen or methyl; X is —[C(CH$_3$)$_2$]— or —[(CH$_2$)$_2$]—; and Y is p-[C$_6$H$_4$]—.

6. The copolymer of claim 5 in which Z is —[C(O)O]—.

7. The copolymer of claim 6 in which the copolymer is soluble in alkaline solutions having a pH of from about 12 to about 14.

8. The copolymer of claim 7 in which R" is t-butyl.

9. The copolymer of claim 4 in which Z is m-[C$_6$H$_4$]—.

10. The copolymer of claim 9 in which the copolymer is soluble in alkaline solutions having a pH of from about 12 to about 14.

11. The copolymer of claim 10 in which R" is t-butyl.

12. The copolymer of claim 1 in which R' is —OC(O)—Ar or —OSO$_2$—Ar.

13. The copolymer of claim 12 in which the copolymer is soluble in alkaline solutions having a pH of from about 12 to about 14.

14. The copolymer of claim 12 in which R is hydrogen or methyl; X is —[C(CH$_3$)$_2$]— or —[(CH$_2$)$_2$]—; and Y is p-[C$_6$H$_4$]—.

15. The copolymer of claim 14 in which Z is —[C(O)O]—.

16. The copolymer of claim 15 in which the copolymer is soluble in alkaline solutions having a pH of from about 12 to about 14.

17. The copolymer of claim 16 in which R' is —OSO$_2$—Ar and Ar is phenyl or 4-methylphenyl.

18. The copolymer of claim 12 in which R is hydrogen or methyl; X is —[C(CH$_3$)$_2$]— or —[(CH$_2$)$_2$]—; and Y is p-[C$_6$H$_4$]—.

19. The copolymer of claim 18 in which Z is —[C(O)O]—.

20. The copolymer of claim 19 in which the copolymer is soluble in alkaline solutions having a pH of from about 12 to about 14.

21. The copolymer of claim 20 in which R' is —OSO$_2$—Ar and Ar is phenyl or 4-methylphenyl.

22. An imageable element comprising an imageable layer over a support, in which the imageable element comprises a photothermal conversion material and a copolymer comprising, in polymerized form:
   (a) about 1 wt % to about 30 wt % of N-phenylmaleimide, N-cyclohexylmaleimide, N-benzylmaleimide, or a mixture thereof;
   (b) about 1 wt % to about 30 wt % of acrylamide, methacrylamide, or a mixture thereof;
   (c) about 20 wt % to about 75 wt % of acrylonitrile, methacrylonitrile, or a mixture thereof; and
   (d) a total of about 20 wt % to about 75 wt % of one or more monomers selected from the group consisting of monomers of the structure:

CH$_2$=C(R)-Z-X—NHC(O)NH—Y—R' in which:
   X is —[C(CH$_3$)$_2$]— or —[(CH$_2$)$_n$]—, in which n is 0 to 12;
   Y is o-, m-, or p- —[C$_6$H$_4$]—;
   Z is —[C(O)O]—, —[C(O)N H]—, or o-, m-, or p-[—C$_6$H$_4$]—;
   R is hydrogen or C$_1$ to C$_4$ alkyl;
   R' is —OC(O)—OR", —OC(O)—Ar, or —OSO$_2$—Ar;
   R" is C$_1$ to C$_{12}$ alkyl, C$_1$ to C$_{12}$ arylalkyl, C$_1$ to C$_{12}$ aryl, C$_1$ to C$_{12}$ alkenyl, trimethylsilyl;
   Ar is C$_6$H$_{5-n'}$T$_{n'}$, in which Ar has a total of six to ten carbon atoms;
   each T is independently selected from the group consisting of C$_1$ to C$_4$ alkyl, fluoro, chloro, bromo, iodo, trifluoromethyl, methoxy, and cyano; and
   n' is an integer from 0 to 5; and
   in which the copolymer is soluble in alkaline solutions having a pH greater than at least about 11.

23. The imageable element of claim 22 in which the copolymer comprises, in polymerized form, about 3 wt % to about 20 wt % of N-phenylmaleimide; about 5 wt % to about 2 wt % of methacrylamide; about 35 wt % to about 60 wt % of acrylonitrile; and a total of about 30 wt % to about 60 wt % of the one or more group (d) monomers, and in which the copolymer is soluble in alkaline solutions having a pH greater than at least about 12.

24. The imageable element of claim 22 in which the imageable element is a single layer imageable element, and the imageable layer comprises the copolymer, the photothermal conversion material, and either (1) a novolac resin and a dissolution inhibitor, (2) a novolac resin that comprises polar groups; or (3) a mixture thereof.

25. The imageable element of claim 24 in which R' is —OC(O)—OR".

26. The imageable element of claim 25 in which R is hydrogen or methyl;
X is —[C(CH$_3$)$_2$]— or —[(CH$_2$)$_2$]—; Y is p-[C$_6$H$_4$]—; and Z is —[C(O)O]— or m-[C$_6$H$_4$]—; and in which the copolymer is soluble in alkaline solutions having a pH of from about 12 to about 14.

27. The imageable element of claim 26 in which R" is t-butyl.

28. The imageable element of claim 24 in which R' is —OC(O)—Ar, or —OSO$_2$—Ar.

29. The imageable element of claim 28 in which R is hydrogen or methyl; X is —[C(CH$_3$)$_2$]— or —[(CH$_2$)$_2$]—; Y is p-[C$_6$H$_4$]—; and Z is —[C(O)O]— or m-[C$_6$H$_4$]—; and in which the copolymer is soluble in alkaline solutions having a pH of from about 12 to about 14.

30. The imageable element of claim 29 in which R' is —OSO$_2$—Ar and Ar is phenyl or 4-methylphenyl.

31. The imageable element of claim 22 in which the element is a multilayer element comprising, in order, the imageable layer, an underlayer, and the substrate;
in which:
the imageable layer comprises (1) a novolac resin and a dissolution inhibitor, (2) a novolac that comprises polar groups; or (3) a mixture thereof; and
the underlayer comprises the copolymer and a binder.

32. The imageable element of claim 31 in which the photothermal conversion material is in the underlayer, and the second binder comprises, in polymerized form, about 25 to about 75 mol % of N-phenylmaleimide; about 10 to about 50 mol % of methacrylamide; and about 5 to about 30 mol % of methacrylic acid.

33. The imageable element of claim 32 in which the underlayer additionally comprises one of more resins having activated methylol or activated alkylated methylol groups.

34. The imageable element of claim 31 in which R' is —OC(O)—OR".

35. The imageable element of claim 34 in which R is hydrogen or methyl;
X is —[C(CH$_3$)$_2$]— or —[(CH$_2$)$_2$]—; Y is p-[C$_6$H$_4$]—; and Z is —[C(O)O]— or m-[C$_6$H$_4$]—; and in which the copolymer is soluble in alkaline solutions having a pH of from about 12 to about 14.

36. The imageable element of claim 35 in which R" is t-butyl.

37. The imageable element of claim 31 in which R' is —OC(O)—Ar, or —OSO$_2$—Ar.

38. The imageable element of claim 37 in which R is hydrogen or methyl; X is —[C(CH$_3$)$_2$]— or —[(CH$_2$)$_2$]—; Y is p-[C$_6$H$_4$]—; and Z is —[C(O)O]— or m-[C$_6$H$_4$]—; and in which the copolymer is soluble in alkaline solutions having a pH of from about 12 to about 14.

39. The imageable element of claim 38 in which R' is —OSO$_2$—Ar and Ar is phenyl or 4-methylphenyl.

40. A method for forming an image, the method comprising the steps of:
thermally imaging an imageable element comprising an imageable layer over a support and forming an imaged imageable element comprising imaged and unimaged regions in the imageable layer;
developing the imaged imageable element with a developer and removing the imaged regions to form a printing plate comprising the image; and
baking the printing plate; in which:
the imageable element comprises the imageable element comprises a photothermal conversion material and a copolymer comprising, in polymerized form:
(a) about 1 wt % to about 30 wt % of N-phenylmaleimide, N-cyclohexylmaleimide, N-benzylmaleimide, or a mixture thereof;
(b) about 1 wt % to about 30 wt % of acrylamide, methacrylamide, or a mixture thereof;
(c) about 20 wt % to about 75 wt % of acrylonitrile, methacrylonitrile, or a mixture thereof; and
(d) a total of about 20 wt % to about 75 wt % of one or more monomers selected from the group consisting of monomers of the structure:

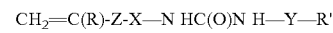

in which:
X is —[C(CH$_3$)$_2$]— or —[(CH$_2$)$_n$]—, in which n is 0 to 12;
Y is o-, m-, or p- —[C$_6$H$_4$]—;
Z is —[C(O)O]—, —[C(O)NH]—, or o-, m-, or p- [—C$_6$H$_4$]—;
R is hydrogen or C$_1$ to C$_4$ alkyl;
R' is —OC(O)—OR", —OC(O)—Ar, or —OSO$_2$—Ar;
R" is C$_1$ to C$_{12}$ alkyl, C$_1$ to C$_{12}$ arylalkyl, C$_1$ to C$_{12}$ aryl, C$_1$ to C$_{12}$ alkenyl, trimethylsilyl;
Ar is C$_6$H$_{5-n'}$T$_{n'}$, in which Ar has a total of six to ten carbon atoms;
each T is independently selected from the group consisting of C$_1$ to C$_4$ alkyl, fluoro, chloro, bromo, iodo, trifluoromethyl, methoxy, and cyano; and
n' is an integer from 0 to 5; and
in which the copolymer is soluble in alkaline solutions having a pH greater than at least about 11.

41. The method of claim 40 in which the copolymer comprises, in polymerized form, about 3 wt % to about 20 wt % of N-phenylmaleimide; about 5 wt % to about 2 wt % of methacrylamide; about 35 wt % to about 60 wt % of acrylonitrile; and a total of about 30 wt % to about 60 wt % of the one or more group (d) monomers, and in which the copolymer is soluble in alkaline solutions having a pH greater than at least about 12.

42. The method of claim 41 in which R is hydrogen or methyl; X is —[C(CH$_3$)$_2$]— or —[(CH$_2$)$_2$]—; Y is p-[C$_6$H$_4$]—; and Z is —[C(O)O]— or m-[C$_6$H$_4$]—; and in which the copolymer is soluble in alkaline solutions having a pH greater than at least about 12 and the developer has a pH of at least about 12.

43. The method of claim 42 in which R' is —OC(O)—OR".

44. The method of claim 43 in which R" is t-butyl.

45. The method of claim 42 in which R' is —OC(O)—Ar, or —OSO$_2$—Ar.

46. The method of claim 42 in which R' is —OSO$_2$—Ar.

47. The method of claim 46 in which Ar is phenyl or 4-methylphenyl.

* * * * *

UNITED STATES PATENT AND TRADEMARK OFFICE
CERTIFICATE OF CORRECTION

PATENT NO. : 7,060,416 B2  Page 1 of 1
APPLICATION NO. : 11/072486
DATED : June 13, 2006
INVENTOR(S) : Ray et al.

It is certified that error appears in the above-identified patent and that said Letters Patent is hereby corrected as shown below:

Column 27 (Claim 1), line 34, delete "R" is $C_1$ to $C_{12}$ alkyl, $C_1$ to $C_{12}$ arylalkyl, $C_1$ to $C_{12}$ aryl, $C_1$ to $C_{12}$ alkenyl, trimethylsilyl;"
and insert -- R" is $C_1$ to $C_{12}$ alkyl, $C_1$ to $C_{12}$ arylalkyl, $C_1$ to $C_{12}$ aryl, $C_1$ to $C_{12}$ alkenyl, or trimethylsilyl; --.

Column 27 (Claim 5), line 55, delete "X is -[C(CII$_3$)$_2$]- or -[(CII$_2$)$_2$]-;"
and insert -- X is -[C(CH$_3$)$_2$]- or -[(CH$_2$)$_2$]-; --.

Column 29 (Claim 26), line 13, delete "having a pII"
and insert -- having a pH --.

Column 29 (Claim 37), line 54, delete "OC(O)  Ar, or  OSO$_2$  Ar."
and insert -- -OC(O)-Ar, or -OSO$_2$-Ar.--.

Column 30 (Claim 40), lines 7-8, delete "the imageable element comprises the imageable element comprises"
and insert -- the imageable element comprises --.

Column 30 (Claim 40), line 21, delete "CH$_2$=C(R)-Z-X N HC(O)N H  Y  R' "
and insert -- CH$_2$=C(R)-Z-X-NHC(O)NH-Y-R' --.

Column 30 (Claim 40), line 31, delete "R" is $C_1$ to $C_{12}$ alkyl, $C_1$ to $C_{12}$ arylalkyl, $C_1$ to $C_{12}$ aryl, $C_1$ to $C_{12}$ alkenyl, trimethylsilyl;"
and insert -- R" is $C_1$ to $C_{12}$ alkyl, $C_1$ to $C_{12}$ arylalkyl, $C_1$ to $C_{12}$ aryl, $C_1$ to $C_{12}$ alkenyl, or trimethylsilyl; --.

Column 30 (Claim 42), line 50, delete "X  is  -[C(CII$_3$)$_2$]-  or  -[(CII$_2$)$_2$]-"
and insert -- X is -[C(CH$_3$)$_2$)-  or  -[(CH$_2$)$_2$]- --.

Signed and Sealed this

Twelfth Day of December, 2006

JON W. DUDAS
*Director of the United States Patent and Trademark Office*